(12) United States Patent
Zimmermann et al.

(10) Patent No.: US 11,217,839 B2
(45) Date of Patent: Jan. 4, 2022

(54) BATTERY ARRANGEMENT FOR STRUCTURALLY INTEGRATING BATTERIES IN A VEHICLE

(71) Applicants: AIRBUS DEFENCE AND SPACE GMBH, Taufkirchen (DE); AIRBUS HELICOPTERS DEUTSCHLAND GMBH, Donauwörth (DE)

(72) Inventors: Kristian Zimmermann, Munich (DE); Petr Schejbal, Munich (DE)

(73) Assignees: Airbus Defence and Space GmbH, Taufkirchen (DE); Airbus Helicopters Deutschland GmbH, Donauwörth (DE)

( * ) Notice: Subject to any disclaimer, the term of this patent is extended or adjusted under 35 U.S.C. 154(b) by 5 days.

(21) Appl. No.: 16/272,010

(22) Filed: Feb. 11, 2019

(65) Prior Publication Data

US 2019/0252744 A1    Aug. 15, 2019

(30) Foreign Application Priority Data

Feb. 12, 2018    (DE) .................. 10 2018 202 114.7

(51) Int. Cl.
*H01M 10/6555* (2014.01)
*H01M 10/613* (2014.01)
(Continued)

(52) U.S. Cl.
CPC ........ *H01M 10/6555* (2015.04); *B64D 27/24* (2013.01); *B64G 1/425* (2013.01);
(Continued)

(58) Field of Classification Search
CPC ........... H01M 10/6555; H01M 10/613; H01M 10/625; H01M 10/6551; H01M 10/6554; H01M 10/6556; H01M 50/20; H01M 50/502; H01M 2220/20; H01M 10/62; H01M 10/6562; H01M 10/643; B64D 27/24; B64D 27/26; B64G 1/425
See application file for complete search history.

(56) References Cited

U.S. PATENT DOCUMENTS 8,383,260 B2    2/2013  Essinger et al.
8,833,499 B2    9/2014  Rawlinson
(Continued)

FOREIGN PATENT DOCUMENTS

CN    205 583 100 U    9/2016
CN    106 240 798 A    12/2016
(Continued)

OTHER PUBLICATIONS

DE102010050826 Greve et al. Espacenet translation (Year: 2010).*
(Continued)

*Primary Examiner* — Anca Eoff
*Assistant Examiner* — Kirsten B Tysl
(74) *Attorney, Agent, or Firm* — Jenkins, Wilson, Taylor & Hunt, P.A.

(57) ABSTRACT

A battery arrangement for structurally integrating batteries in a vehicle, in particular an aircraft or spacecraft, includes at least one battery, two supporting cooling plates between which the at least one battery is held on both sides via battery holders, and connecting rods which connect the two cooling plates to one another.

9 Claims, 4 Drawing Sheets

(51) Int. Cl.
*B64D 27/24* (2006.01)
*B64G 1/42* (2006.01)
*H01M 10/625* (2014.01)
*H01M 10/6551* (2014.01)
*H01M 10/6554* (2014.01)
*H01M 10/6556* (2014.01)
*H01M 50/20* (2021.01)
*H01M 50/502* (2021.01)

(52) U.S. Cl.
CPC ....... *H01M 10/613* (2015.04); *H01M 10/625* (2015.04); *H01M 10/6551* (2015.04); *H01M 10/6554* (2015.04); *H01M 10/6556* (2015.04); *H01M 50/20* (2021.01); *H01M 50/502* (2021.01); *H01M 2220/20* (2013.01)

(56) References Cited

U.S. PATENT DOCUMENTS

| | | | |
|---|---|---|---|
| 8,967,529 | B1 | 3/2015 | Bennett |
| 9,559,394 | B2 | 1/2017 | Eckl et al. |
| 2006/0125442 | A1 | 6/2006 | Andersson et al. |
| 2009/0255109 | A1 | 10/2009 | Weber et al. |
| 2011/0183183 | A1 | 7/2011 | Grady et al. |
| 2011/0212355 | A1 | 9/2011 | Essinger et al. |
| 2012/0100407 | A1 | 4/2012 | Inoue et al. |
| 2013/0065103 | A1 | 3/2013 | Yumura |
| 2015/0266387 | A1 | 9/2015 | Garfinkel et al. |
| 2015/0349390 | A1 | 12/2015 | Aiba et al. |
| 2016/0276637 | A1 | 9/2016 | Kusaba |
| 2017/0047624 | A1 | 2/2017 | Gunna et al. |
| 2018/0175466 | A1* | 6/2018 | Seo .................. H01M 10/6557 |
| 2019/0252655 | A1 | 8/2019 | Zimmermann |
| 2019/0296300 | A1 | 9/2019 | Zimmermann et al. |
| 2019/0334134 | A1* | 10/2019 | Reingruber ....... H01M 10/6556 |

FOREIGN PATENT DOCUMENTS

| | | | | |
|---|---|---|---|---|
| CN | 110165098 A | | 8/2019 | |
| CN | 110165100 A | | 8/2019 | |
| CN | 110294133 A | | 10/2019 | |
| DE | 102010050826 A1 | * | 5/2012 | ............... B60K 1/04 |
| DE | 10 2011 016 738 A1 | | 10/2012 | |
| DE | 10 2012 213 273 A1 | | 2/2014 | |
| DE | 10 2015 214 185 B4 | | 3/2017 | |
| DE | 10 2016 010 830 A1 | | 3/2017 | |
| DE | 10 2016 120 838 A1 | | 5/2018 | |
| EP | 3 220 444 A1 | | 9/2017 | |
| EP | 3 525 257 A1 | | 8/2019 | |
| EP | 3 525 259 A1 | | 8/2019 | |
| EP | 3 544 083 A1 | | 9/2019 | |
| EP | 3 525 257 B1 | | 8/2020 | |
| EP | 3 525 259 B1 | | 12/2020 | |
| JP | 2007234369 A | * | 9/2007 | |
| JP | 2019194972 A | | 11/2019 | |
| KR | 20190098705 A | | 8/2019 | |
| WO | WO 2011/149868 A1 | | 12/2011 | |
| WO | WO 2017/004078 A1 | | 1/2017 | |

OTHER PUBLICATIONS

JP2007234369A Fujii et al., Espacenet Translation (Year: 2007).*
German Office Action for Application No. 10 2018 202 120.1 dated Dec. 14, 2018.
German Office Action for Application No. 10 2018 202 114.7 dated Dec. 20, 2018.
European Office Action for Application No. 19156600.9 dated Mar. 20, 2020.
Extended European Search Report for Application No. 19155733.9 dated Apr. 9, 2019.
European Search Report for Application No. 19162541.7 dated Jun. 27, 2019.
Extended European Search Report for Application No. 19156600.9 dated Jul. 11, 2019.
Non-Final Office Action for U.S. Appl. No. 16/360,757 dated Jun. 29, 2020.
Non-Final Office Action for U.S. Appl. No. 16/272,363 dated Dec. 18, 2020.
Final Office Action for U.S. Appl. No. 16/360,757 dated Jan. 4, 2021.
Advisory Action for U.S. Appl. No. 16/360,757 dated Mar. 16, 2021.
Final Office Action for U.S. Appl. No. 16/272,363 dated May 19, 2021.
Non-Final Office Action for U.S. Appl. No. 16/360,757 dated May 24, 2021.

* cited by examiner

BATTERY ARRANGEMENT FOR STRUCTURALLY INTEGRATING BATTERIES IN A VEHICLE

CROSS-REFERENCE TO RELATED APPLICATION

This application claims priority to German Application No. 10 2018 202 114.7 filed Feb. 12, 2018, the entire disclosure of which is incorporated by reference herein.

TECHNICAL FIELD

The disclosure herein relates to a battery arrangement for structurally integrating batteries in a vehicle, in particular an aircraft or spacecraft.

BACKGROUND

Although usable in various applications, the disclosure herein and the problem on which it is based are explained in more detail with respect to passenger aircraft. However, the described methods and apparatuses may likewise be used in different vehicles and in all sectors of the transport industry, for example for road vehicles, for rail vehicles, for aircraft or for watercraft.

Lithium ion rechargeable batteries can be found as rechargeable energy stores in a wide variety of fields of technology. In particular, they are used as energy stores for electric cars and hybrid vehicles in electric mobility. For this purpose, many manufacturers implement a multiplicity of batteries or battery cells in the form of so-called battery packs in a vehicle structure, for example a motor vehicle body. Several thousand individual cells may be connected to one another in such a battery pack or battery set, for example lithium ion round cells having a cylinder diameter of approximately 20 mm and a length of approximately 100 mm.

However, the generic integration concepts pursued here are not always suitable for satisfying the technical requirements and boundary conditions for aircraft in terms of structure. Additional reinforcement measures, for example additional reinforcing structures, would immediately increase the weight and ultimately therefore the fuel consumption.

In order to operate such batteries as efficiently as possible, it is necessary, in typical applications, to provide active temperature control of the batteries. This is relevant not least in the aviation and aerospace sectors on account of the highly fluctuating operating or ambient temperatures. In order to suitably control the temperature of the batteries in a battery pack, it is possible to use, for example, apparatuses such as cooling plates or the like in which a liquid and/or a gas is flushed through fluid channels, see, for example, the documents U.S. Pat. No. 8,383,260 B2 and US 2017/0047624 A1. Such cooling apparatuses additionally increase the weight.

SUMMARY

Against this background, the disclosure herein is based on the object of finding solutions for integrating a large number of battery cells in a vehicle in an efficient and lightweight manner.

According to the disclosure herein, this object is achieved by a battery arrangement and by an aircraft or spacecraft having features disclosed herein.

Accordingly, a battery arrangement for structurally integrating batteries in a vehicle is provided. The battery arrangement comprises at least one battery; two supporting cooling plates between which the at least one battery is held on both sides via battery holders; and a plurality of connecting rods which connect the two cooling plates to one another.

An aircraft and spacecraft having a battery arrangement according to the disclosure herein are also provided.

One idea on which the disclosure herein is based is to make cooling plates multifunctional in such a manner that they also undertake structural functions in addition to thermal functions. On the one hand, the cooling plates are used to control the temperature of the batteries, that is to say to dissipate the heat produced by the batteries, in particular. On the other hand, the cooling plates according to the disclosure herein are used as structural components and in this manner contribute to the structural integrity of the battery arrangement or the vehicle. The battery arrangement according to the disclosure herein and therefore the batteries themselves are carried by two cooling plates for this purpose. Additional connecting rods are used to reinforce the arrangement with respect to tensile stresses. However, compressive and shear forces can also be directly conducted through the at least one battery or battery cell, that is to say the at least one battery can assume at least some of the loads. This makes it possible to save additional structure-reinforcing components, which in turn optimizes the number of components and ultimately the weight. Viewed differently, these measures can be used to improve the weight-dependent energy or power density of a battery arrangement or a vehicle. Furthermore, the battery arrangement can replace existing structures to some extent since loads can be conducted through the battery arrangement.

A battery in the sense of the disclosure herein is a general rechargeable electrical storage element. This may be a secondary cell, that is to say an individual storage element in the sense of a secondary element, a rechargeable battery cell, a battery cell or the like. In principle, however, batteries according to the disclosure herein likewise comprise interconnected secondary cells and/or interconnected storage elements, that is to say a battery comprising secondary cells. Batteries in the sense of the disclosure herein comprise lithium ion rechargeable batteries, in particular. The battery holders can be designed, in particular, to accommodate cylindrical batteries or battery cells.

Advantageous configurations and developments emerge from the description with reference to the figures.

According to one development, one cooling plate can be connected to one battery holder in each case via shear pins. In this case, the shear pins are used, inter alia, to absorb shear forces which act on the batteries or the cooling plates. Alternatively or additionally, the battery holders can be connected to the cooling plate in another manner, for example using an integral material connection such as an adhesive or welded connection.

According to one development, the shear pins may contain a plastic material. In particular, the shear pins may be produced from a plastic material. Selecting a plastic material makes it possible to save weight in comparison with a variant having a metal material. Since the shear forces which occur in many applications are considerably lower than, for example, the tensile and/or compressive forces acting on the battery arrangement, a plastic material provides a weight-efficient solution. Furthermore, electrical short circuits with the electrical connections of the at least one battery are excluded in this manner.

According to one development, the at least one battery can be mounted on both sides in the battery holders in a form-fitting manner. For example, the battery holders may be produced from a plastic. A form-fitting connection avoids tolerances to the greatest possible extent. In principle, however, alternative embodiments are likewise provided. For example, the batteries may be coupled on one side or on two sides to the current collector via an electrically conductive spring without the battery having to be connected to the current collector in another manner, for example using a welded connection, as is conventionally customary. On the other hand, such a spring automatically compensates for tolerances. The at least one battery may be fastened to the battery holder using a thermally conductive adhesive, for example. In principle, however, mechanical holders and/or plug-in, click and/or snap mechanisms or the like are likewise provided for the purpose of fastening the at least one battery.

According to one development, the battery holders may be in the form of plates having a battery receptacle for accommodating the at least one battery on one side. For example, each battery holder can be releasably or non-releasably fastened to the corresponding cooling plate, for example via an adhesive connection and/or a screw, plug-in or rivet connection or the like. For mounting, the at least one battery can be initially introduced into the battery holder of one cooling plate on one side and fastened. In a second step, the battery holder of the second cooling plate can be attached and can be plugged together with the structure in such a manner that the other side of the at least one battery is introduced into the further battery holder.

According to one development, two current collectors may also be provided, to which the at least one battery is respectively electrically coupled on both sides. For example, a bus bar, for example a copper rail, to which the battery holder can in turn be adhesively bonded (the battery holder may have a plastic and/or may be produced from a plastic, for example), can be respectively applied to each cooling plate. The battery holders may also have battery receptacles which are designed with a through-hole or a passage opening to the corresponding current collector. The at least one battery can be welded to the bus bar in the conventional manner, for example, or can be electrically coupled to the bus bar in another manner. In order to avoid electrical short circuits between the cooling plate and the current collector or the bus bar in the case of a metal cooling plate, an electrical insulation layer may also be applied to the cooling plate under the current collector. The specific electrical wiring and connection of the batteries can be carried out in any desired manner familiar to a person skilled in the art, for example as a serial and/or parallel circuit.

According to one development, the cooling plates can be integrally produced from a metal material having a multiplicity of fluid channels. On the other hand, the battery holders can be formed from a plastic or from another lightweight material for the purpose of reducing weight. For example, the cooling plate may be produced from a metal, a metal alloy, a metal material and/or a combination of these materials. In one specific example, the cooling plate is produced from titanium. In order to produce the cooling plates, it is possible to use, for example, an additive method in which the cooling plates are completely produced in an integral manner without the need for special effort, additional mounting steps or even manual work. In principle, the cooling plates can be produced from all materials or material combinations for which additive methods are known.

In generative or additive production methods, also generally referred to as "3-D printing methods", one or more starting materials are sequentially layered above one another in layers, starting from a digitized geometrical model of an object, and are hardened. In the case of selective laser melting (SLM) for example, a component is constructed in layers from a modelling material, for example a plastic or a metal, by applying the modelling material in powder form to a substrate and liquefying it in a targeted manner by local laser radiation, thus resulting in a solid cohesive component after cooling. 3-D printing provides extraordinary design freedom and allows, inter alia, objects, which could not be produced using conventional methods or could be produced only with considerable effort, to be produced with reasonable effort. For this reason, 3-D printing methods are currently widespread in industrial design, in the automotive industry, the aviation and aerospace industries or generally in industrial product development in which a resource-efficient process chain is used for the appropriate small-scale and large-scale production of individualized components.

3-D printing methods are particularly advantageous in the present case since they make it possible to produce three-dimensional components in casting methods without requiring special production tools matched to the outer shape of the components. This enables highly efficient, material-saving and time-saving production processes for parts and components. Such 3-D printing methods are particularly advantageous in the aviation and aerospace sectors since very many different components which are matched to specific intended purposes are used there and can be produced in such 3-D printing methods at low cost, with a short production lead time and with little complexity in the production installations required for production. 3-D printing methods in the sense of the present application comprise all generative or additive production methods in which objects of a predefined shape are produced on the basis of geometrical models from shapeless materials such as liquids and powders or neutrally shaped semi-finished products, for instance material in the form of tape or wire, by chemical and/or physical processes in a special generative production system. 3-D printing methods in the sense of the present application use additive processes in this case in which the starting material is sequentially constructed in layers in predefined shapes.

According to one development, the connecting rods can contain a metal material. In particular, the connecting rods may be produced from a metal material. For example, the connecting rods may contain and/or be produced from a metal, a metal alloy, a metal material and/or a combination of these materials. In this manner, the connecting rods can accordingly have a robust design for absorbing relatively large tensile and/or compressive loads.

According to one development, at least two side walls may also be provided, which close off the cooling plates with the at least one battery in between. The side walls may be produced, for example, from a plastic, a ceramic material, a metal material or a combination of these materials. In principle, the side walls can therefore form, to some extent, a housing of the battery arrangement in interaction with the cooling plates, but at least the cooling plates also undertake structural tasks.

According to one development, at least one of the side walls may be in the form of a heat exchanger having a multiplicity of cooling ribs. In this embodiment, a design of the corresponding side wall(s) from a metal material is appropriate, in particular. The cooling ribs are particularly advantageous for dissipating heat produced by the batteries to the outside.

According to one development, the side walls may close off a multiplicity of cooling plates with batteries in between. Generally, a set of two cooling plates with the batteries held in between can be respectively interpreted as a battery module. For example, a multiplicity of such battery modules can be combined with one another in order to form a battery set having a large number of individual cells. In this case, the multiplicity of battery modules can be closed off by the side walls.

According to one development, the battery arrangement can be coupled to the aircraft or spacecraft via at least two side walls which close off the cooling plates with the at least one battery in between. For example, the side walls may have fastening points and/or devices for coupling to the vehicle, for example lugs, holes etc. In this configuration of the disclosure herein, the side walls are therefore used as mounting interfaces to the corresponding vehicle. In this embodiment, the load path therefore extends from the individual batteries or battery cells, via the battery holders, to the cooling plates and, from there, to the vehicle via the side walls.

The above configurations and developments can be combined with one another in any desired manner if useful. Further possible configurations, developments and implementations of the disclosure herein also comprise not explicitly mentioned combinations of features of the disclosure herein which are described above or below with respect to the exemplary embodiments. In particular, a person skilled in the art will also add individual aspects as improvements or additions to the respective basic form of the disclosure herein.

BRIEF DESCRIPTION OF THE DRAWINGS

The disclosure herein is explained in more detail below on the basis of the exemplary embodiments indicated in the schematic figures, in which.

The accompanying figures are intended to provide a further understanding of the embodiments of the disclosure herein. They illustrate embodiments and are used, in connection with the description, to explain principles and concepts of the disclosure herein. Other embodiments and many of the advantages mentioned emerge with regard to the drawings. The elements in the drawings are not necessarily shown true to scale with respect to one another.

In the figures of the drawing, identical, functionally identical and identically acting elements, features and components are each provided with the same reference signs, unless stated otherwise.

DETAILED DESCRIPTION

Figure 1:
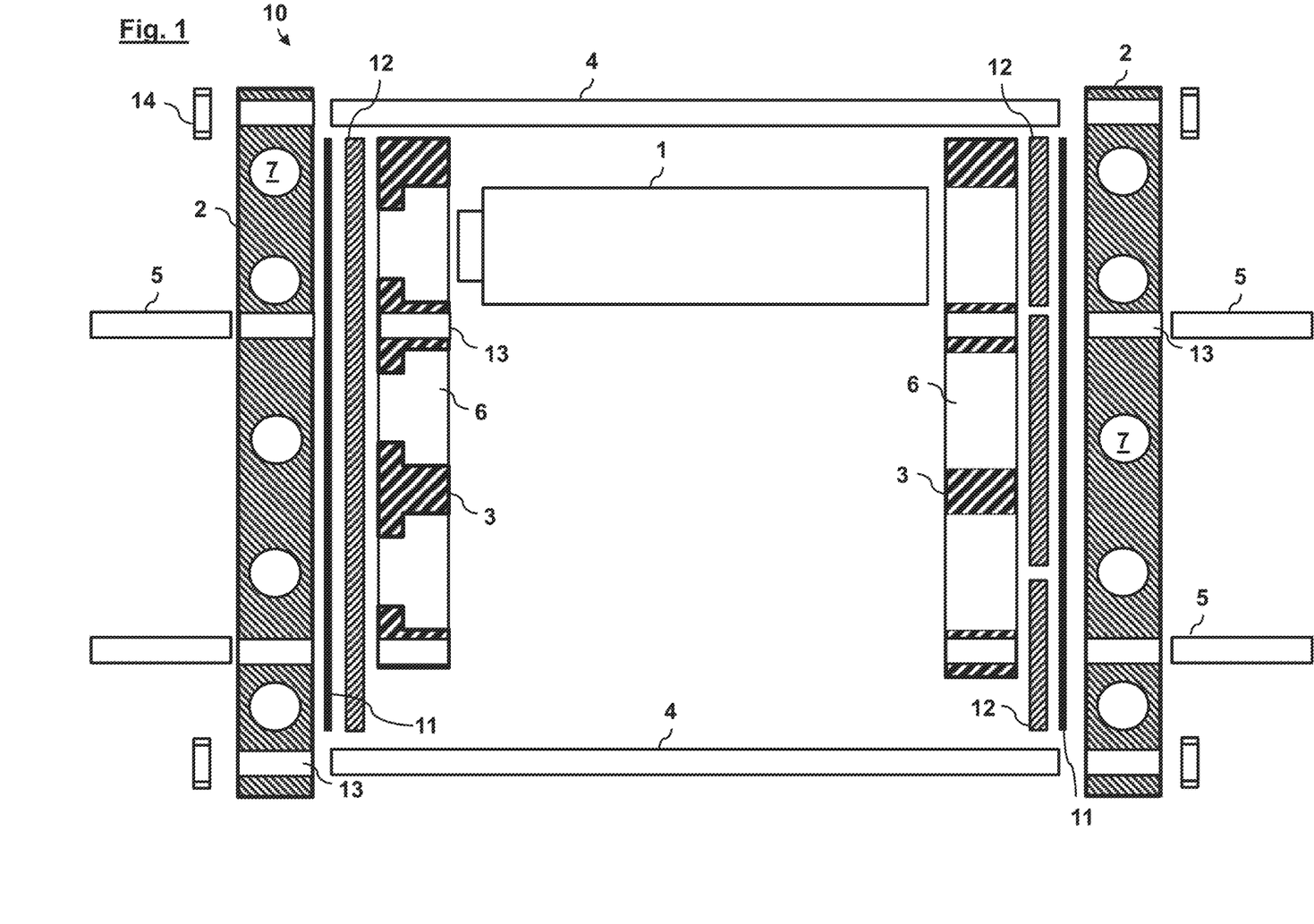
FIG. 1 shows a schematic sectional view of the individual parts of a battery arrangement according to one embodiment of the disclosure herein.
Figure 2:
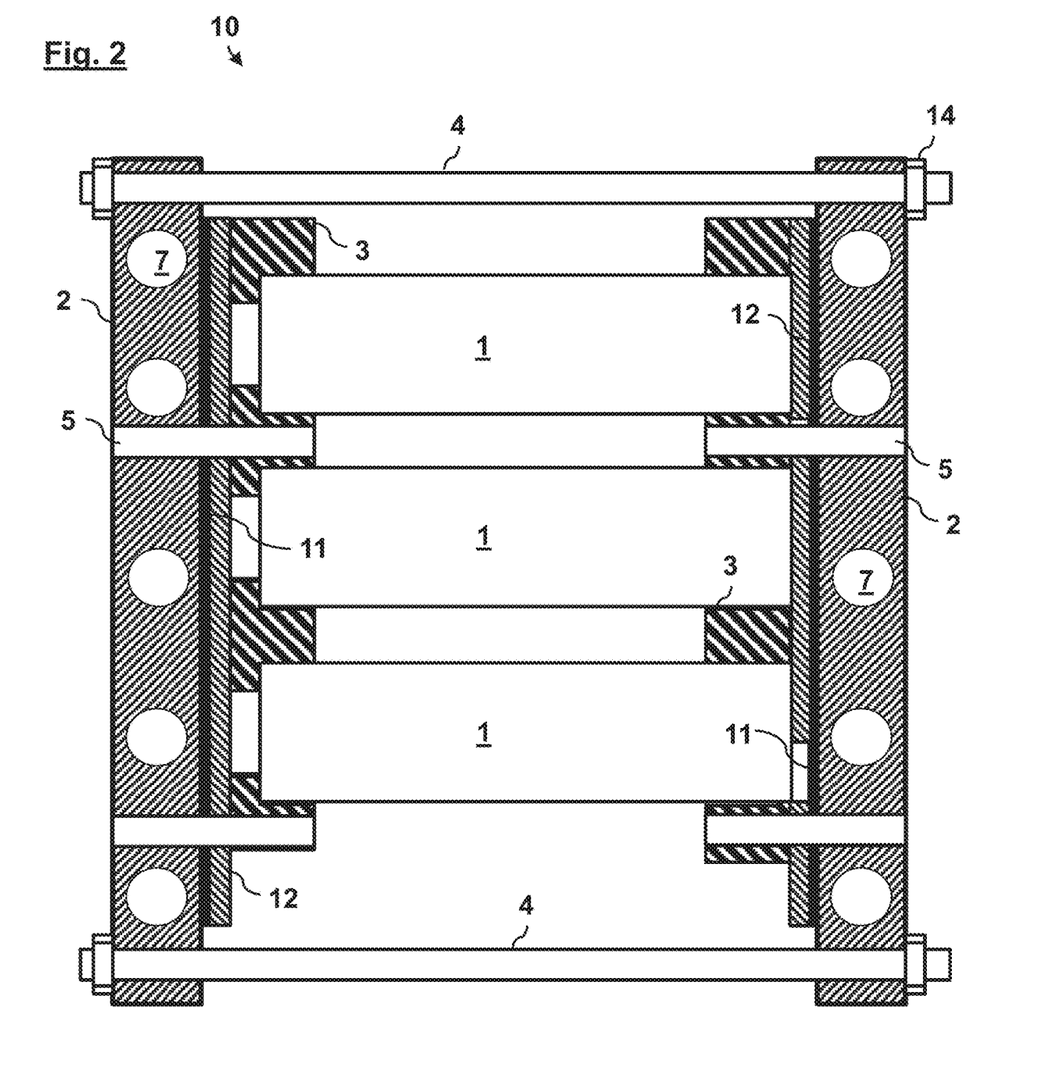
FIG. 2 shows a schematic sectional view of the battery arrangement from FIG. 1 in the mounted state.
Figure 3:
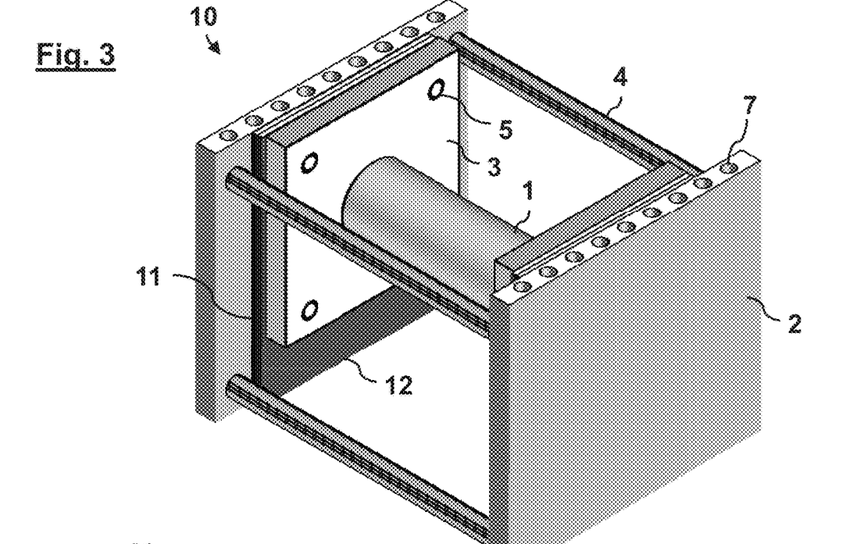
FIG. 3 shows a schematic perspective view of the battery arrangement from FIG. 2.

FIG. 1 shows a schematic sectional view of the individual parts of a battery arrangement 10 according to one embodiment of the disclosure herein, whereas FIGS. 2 and 3 depict the battery arrangement from FIG. 1 in the mounted state (FIG. 3 shows only an individual battery in a simplifying manner).

Figure 6:
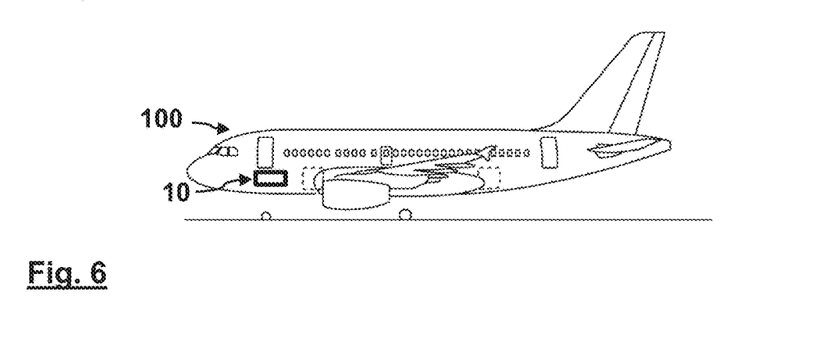
FIG. 6 shows a schematic side view of an aircraft having one of the battery arrangements from FIGS. 1-5.

The battery arrangement 10 is used to structurally integrate batteries 1 in a vehicle, in particular an aircraft 100 (for example a passenger aircraft), as can be schematically seen in FIG. 6. The battery arrangement 10 comprises a multiplicity of batteries 1 (for example individual lithium ion battery cells) which are held between two supporting cooling plates 2 on both sides via battery holders 3. In this case, the cooling plates 2 have a multiplicity of fluid channels 7 which are designed to conduct a fluid, that is to say a gas and/or a liquid. The battery arrangement 10 also comprises a plurality of connecting rods 4, which connect the two cooling plates 2 to one another, and a plurality of shear pins 5 which couple the cooling plates 2 to the battery holders 3. For the mounting of the connecting rods 4 and shear pins 5, the cooling plates 2 and the battery holders 3 have accordingly designed through-holes 13, through which the pins or rods can be passed. Different measures can be pursued for fastening. For example, the connecting rods 4 and/or shear pins 5 can be adhesively bonded to the cooling plates 2 or battery holders 3 using an adhesive. In another example, the connecting rods 4 and/or shear pins 5 may have external threads onto which fastening nuts 14 can be screwed, for example. Additionally or alternatively, the through-holes 13 may comprise corresponding internal threads. A multiplicity of solutions of how the individual components can be connected to one another will be revealed to a person skilled in the art. For example, the battery holders 3 can be additionally adhesively bonded to the cooling plates 2.

In this embodiment, the cooling plates 2 are used as supporting structural components which not only hold and fix the batteries 1 in the aircraft 100 but are also used to structurally reinforce the aircraft 100 as such. Stability with respect to tensile or compressive forces and shear forces is achieved in this case by the connecting rods 4 and the shear pins 5 which connect the cooling plates 2 to one another and to the battery holders 3. In this embodiment, the cooling plates 2 are advantageously integrally produced from titanium or a titanium alloy using an additive method, that is to say a highly stable material with a high strength with a relatively low density. In this case, 3-D printing methods make it possible to produce the cooling plates 2, including the through-holes 13 and the fluid channels 7, completely in one process step, which would be possible at best with considerable effort using conventional methods. The connecting rods 4 are likewise formed from a metal material, for example likewise titanium or a titanium alloy. In contrast, a plastic material is provided for the shear pins 5 in this exemplary embodiment, for the purpose of minimizing weight.

The battery holders 3 also have battery receptacles 6 which accommodate each of the individual batteries 1 with an accurate fit. The battery receptacles 6 may be cylindrical, for example, for accommodating one or more cylindrical batteries 1. The batteries 1 may be, for example, a known type of lithium ion secondary battery which is in the form of a round cell and is often used in the field of electric cars, for example. In principle, each battery 1 can be fastened in the battery receptacle 6, for example using a thermally conductive adhesive or a mechanical holder. A current collector 12, for example a bus bar such as a copper rail or the like, is respectively arranged between each battery holder 3 and the respective cooling plate 2, with the result that the respective battery 1 can be electrically coupled inside the battery receptacle 6. For this purpose, the batteries can be welded to the bus bar, for example. For the purpose of avoiding electrical short circuits, an insulation layer 11 is also provided between the corresponding cooling plate and the current collector 12. The battery holders 3 may be produced in the form of plates from a material having a high thermal conductivity.

In this exemplary embodiment, the cooling plates 2 are not only used to cool or control the temperature of the batteries 1. In addition, the batteries 1 are fixed via the cooling plates 2. In this case, the cooling plates 2 are structural components having supporting or reinforcing functions and are therefore multifunctional. This makes it possible to save advanced structure-reinforcing components and therefore weight and ultimately fuel. The cooling plates 2 can also be connected to a separate, external heat exchanger (not depicted) in order to dissipate the heat or power loss produced.

Figure 4:
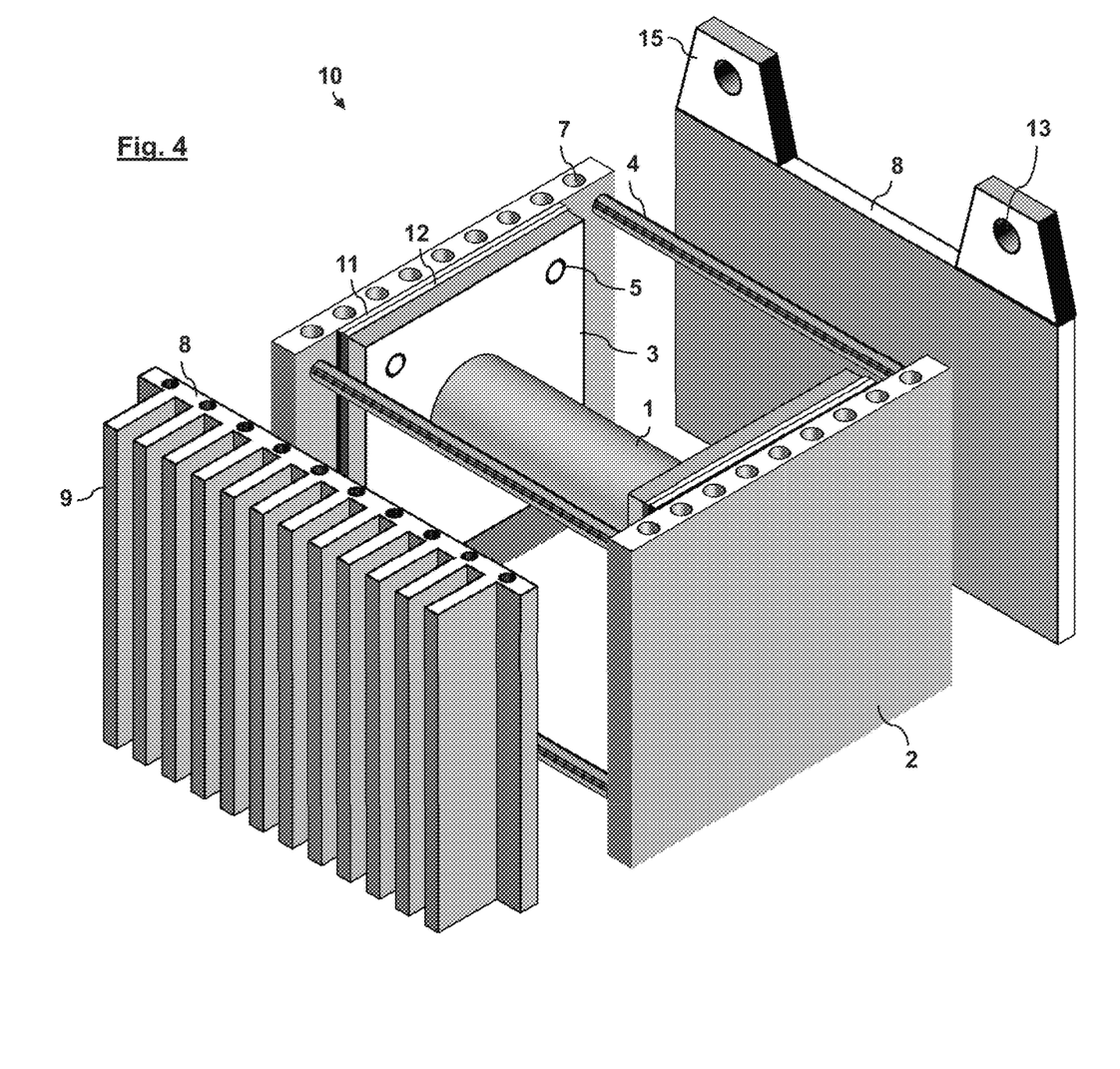
FIG. 4 shows a schematic perspective view of the battery arrangement from FIG. 2 with additional side walls.

FIG. 4 shows a schematic perspective view of the battery arrangement 10 from FIGS. 2 and 3 with two additional side walls 8. The two side walls 8 enclose the cooling plates 2 with the batteries 1 in between in a housing-like manner and are also used to mount or couple the battery arrangement 10 inside the aircraft 100. For this purpose, the side walls 8 have (fastening) lugs 15. The side walls 8 are also at least partially designed with cooling ribs 9 for the purpose of dissipating the heat produced by the batteries 1. Just like the cooling plates 2, the side walls 8 may also be produced from a metal material, for example titanium.

Figure 5:
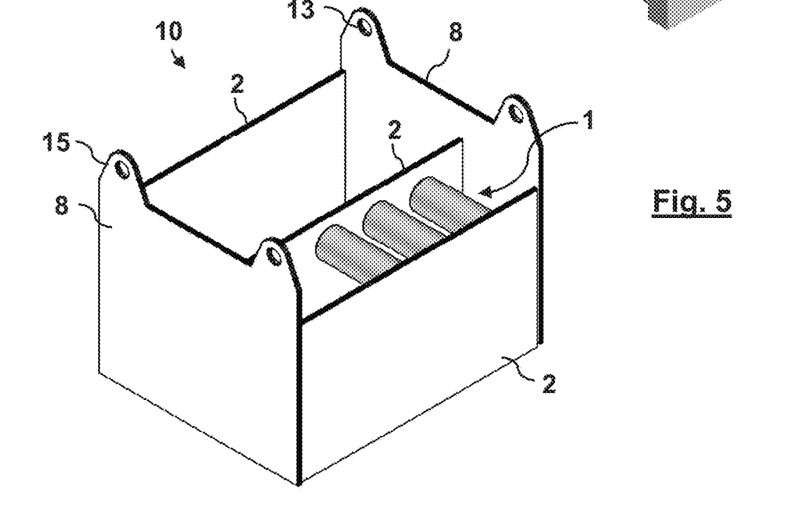
FIG. 5 shows a schematic perspective view of a battery arrangement according to another embodiment of the disclosure herein.

FIG. 5 shows, purely by way of example, a fully assembled battery arrangement 10 according to another embodiment of the disclosure herein in which a multiplicity of batteries 1 are held by a plurality of cooling plates 2. The fundamental structure can correspond in this case to that in FIGS. 1 through 4. Accordingly, the batteries 1 are also enclosed here in a housing-like manner by the cooling plates 2 and the side walls 8. The load path therefore extends from the individual batteries 1 or battery cells, via the battery holders 3, to the cooling plates 2 and, from there, to the aircraft 100 via the side walls 8. However, FIG. 5 shows, by way of example, two modules of batteries 1 which are each held between two cooling plates 2. This is intended to indicate that a multiplicity of such modules or similar modules can be enclosed by the side walls 8, in principle, without installing a very large number of batteries 1.

In the preceding detailed description, various features have been combined in one or more examples for the purpose of improving the rigorousness of the illustration. It should be clear here, however, that the above description is of merely illustrative, but in no way restrictive nature. It serves to cover all alternatives, modifications and equivalents of the various features and exemplary embodiments. Many other examples will be immediately and directly clear to a person skilled in the art on the basis of the latter's technical knowledge in view of the above description.

The exemplary embodiments have been chosen and described in order to be able to present the principles underlying the disclosure herein and their application possibilities in practice in the best possible way. As a result, those skilled in the art can optimally modify and utilize the disclosure herein and its various exemplary embodiments with regard to the intended purpose of use. In the claims and the description, the terms "including" and "having" are used as neutral linguistic concepts for the corresponding terms "comprising". Furthermore, use of the terms "a", "an" and "one" shall not in principle exclude a plurality of features and components described in this way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority

LIST OF REFERENCE SIGNS

1 Battery
2 Cooling plate
3 Battery holder
4 Connecting rod
5 Shear pin
6 Battery receptacle
7 Fluid channel
8 Side wall
9 Cooling rib
10 Battery arrangement
11 Insulation
12 Current collector
13 (Through-)hole
14 Fastening nut
15 Lug
100 Aircraft

The invention claimed is:

1. A battery arrangement for structurally integrating batteries in a vehicle, the battery arrangement comprising:
   at least one battery;
   two supporting cooling plates integrally produced from a metal material having a multiplicity of fluid channels, wherein the at least one battery is held between the two supporting cooling plates on both sides via battery holders;
   a plurality of connecting rods which connect the two supporting cooling plates to one another; and
   at least two side walls which close off the supporting cooling plates with the at least one battery in between, each of the at least two side walls comprising fastening lugs used to mount or couple the battery arrangement inside the vehicle, wherein at least one of the side walls comprises a plurality of cooling ribs configured as a heat exchanger for dissipating heat produced by the batteries to outside the battery arrangement;
   wherein each respective cooling plate is connected to the respective battery holder via shear pins.

2. The battery arrangement according to claim 1, wherein the shear pins contain a plastic material.

3. The battery arrangement according to claim 1, wherein the at least one battery is mounted on both sides in the battery holders in a form-fitting manner.

4. The battery arrangement according to claim 1, wherein the battery holders are in a form of plates having a battery receptacle for accommodating the at least one battery on one side.

5. The battery arrangement according to claim 1, further comprising:
two current collectors to which the at least one battery is respectively electrically coupled on both sides on which the battery is held by the battery holders.

6. The battery arrangement according to claim 1, wherein the connecting rods contain a metal material.

7. The battery arrangement according to claim 1, wherein the side walls close off a multiplicity of cooling plates with batteries in between.

8. An aircraft or spacecraft having a battery arrangement for structurally integrating batteries in an aircraft or spacecraft, the battery arrangement comprising:
at least one battery;
two supporting cooling plates integrally produced from a metal material having a multiplicity of fluid channels, wherein the at least one battery is held between the two supporting cooling plates on both sides via battery holders;
a plurality of connecting rods which connect the two supporting cooling plates to one another; and
at least two side walls which close off the supporting cooling plates with the at least one battery in between, each of the at least two side walls comprising fastening lugs used to mount or couple the battery arrangement inside the vehicle, wherein at least one of the side walls comprises a plurality of cooling ribs configured as a heat exchanger for dissipating heat produced by the batteries to outside the battery arrangement;
wherein each respective supporting cooling plate is connected to the respective battery holder via shear pins.

9. The aircraft or spacecraft according to claim 8, wherein the battery arrangement is coupled to the aircraft or spacecraft via the at least two side walls which close off the cooling plates with the at least one battery in between.

* * * * *